Nov. 13, 1923.
F. C. SHOWN
1,474,296
MEAT HOLDER
Filed April 18, 1922
Fig. 1.
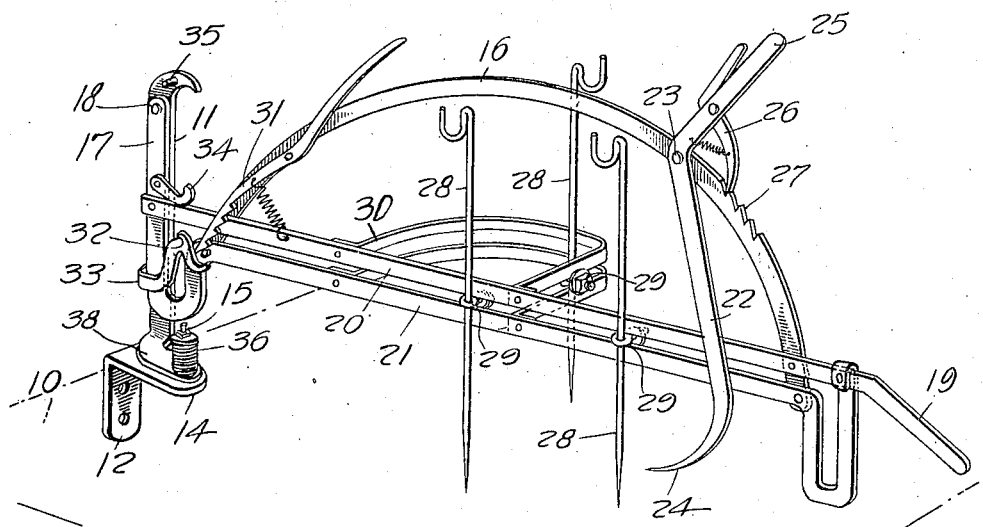
Fig. 2.
Fig. 3.
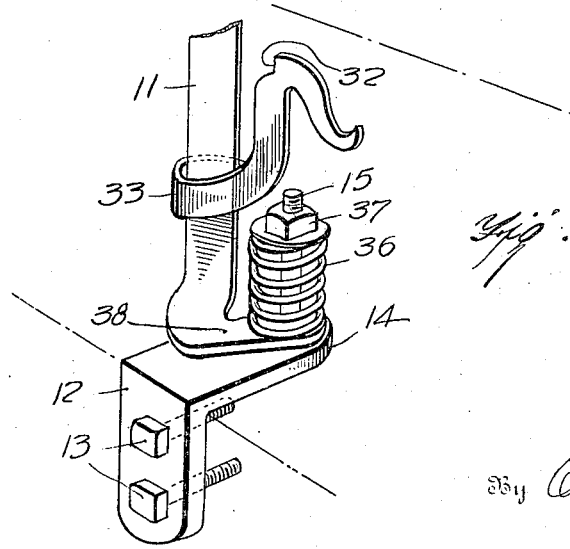
Inventor
F. C. Shown,
By
Attorney Patented Nov. 13, 1923.

1,474,296

UNITED STATES PATENT OFFICE.

FINLEY C. SHOWN, OF CLARENDON, ARKANSAS, ASSIGNOR OF ONE-HALF TO O. H. BOWDEN, OF CLARENDON, ARKANSAS.

MEAT HOLDER.

Application filed April 18, 1922. Serial No. 554,928.

*To all whom it may concern:*

Be it known that I, FINLEY C. SHOWN, residing at Clarendon, county of Monroe, and State of Arkansas, a citizen of the United States, have invented certain new and useful Improvements in Meat Holders, of which the following is a specification.

The ordinary practice with butchers in cutting up large pieces or chunks of meat on the customary butcher's block when it is necessary to saw the bone is to fasten the meat to the block by driving long metal pins through the meat into the block because unless the meat is so secured and held the cutting operation is rendered difficult by the sliding or movement of the meat upon the block. This results in forming deep holes in the block which fill up with blood and grease and thus produce an unsanitary and other objectionable condition. The object of my invention is to provide means by which under such conditions the meat can be firmly held without the necessity of driving pins into the block, and with this object in view, my invention consists in a meat holding attachment for butcher blocks having such characteristics of construction as are defined by or included within the scope of the appended claims.

In the accompanying drawings, Figure 1 is a perspective view of a meat holder embodying my invention shown as it appears when in position to hold the meat for a cutting operation. Fig. 2 is a detail view in perspective of the means for connecting the device to a meat block; and Fig. 3 is a detail view in section of the chuck pin attaching means.

While my invention is provided for use with a butcher's block, it requires no change in the construction of the block whatever, which, of course, is an important consideration both in regard to the matter of cost and in permitting the block to be used in the customary manner in all respects. I show in the drawings a butcher's block, 10, of the usual construction. At one side of such block and projecting a substantial distance above the top is a post or standard, 11, which is secured to the block by means of a foot that is of angle shape so that it has a vertically extending strap, 12, that has holes for the passage of bolts, 13, into the side of the block and a horizontally extending strap, 14, that bears upon the upper side of the block and with which the standard, 11, is connected by a pivot, 15, that permits the standard to swing horizontally for the purpose of enabling the meat engaging devices hereinafter described which are supported by the standard, 11, to swing horizontally with reference to the block.

Pivoted at the upper end of the post or standard, 11, is a frame that comprises an upwardly arched bar, 16, of steel which at one extremity is bent upward to form a leg, 17, which at its end is pivoted by a bolt, 18, to the standard, 11, and at its opposite end is bent upward and then outward to form a handle, 19, by which the frame and the parts carried thereby may be swung up and down upon the pivotal connection with the standard, 11. Said frame also comprises a pair of parallel steel bars, 20 and 21, respectively, which extend chord-wise across the arched bar, the upper bar, 20, being attached to both the arched portion of the bar, 16, and its upwardly bent extremities, thus adding to the rigidity of the frame, while the lower bar, 21, is attached only to the arched or curved portion of the bar, 16. The bars, 20 and 21, are in a sufficiently elevated position that when the frame is lowered for the purpose of holding meat on the block, 10, such bars will be above the meat even though the extremities of the arched portion of the bar, 16, rests upon the top of the block.

The frame formed as described carries or supports meat-engaging devices which comprise an arm or lever, 22, that is pivoted at 23 to the curved arm, 16, and thence extends towards the bottom of the frame where it terminates in a sharpened hook, 24, that curves in towards the center of the block and is situated near the handle end of the frame so that it may be engaged with the outer side of a chunk of meat lying on the block. Said hook-carrying arm, 22, has an upwardly extending handle, 25, by which it may be manipulated, and a pawl or dog, 26, pivoted to the handle, 25, adapted to engage ratchet teeth, 27, on the arm, 16, to hold the hook into whatever position it may be moved to engage it with the meat. Besides the meat engaging hook, 24, I make use of the ordinary long metal pins, 28, which are commonly known as chuck pins, which pass through eyes, 29, provided for the purpose on the frame bars and which are thrust into the meat, but, of course, not far enough to penetrate the block so that as such pins are mounted on the frame and the hook is mounted on the frame the meat will be securely held by its attachment to the frame and the frame being mounted on the block, the meat may be immovably supported on the block. It will be seen that the meat will be gripped betwen the hook and the near pin 28. Projecting horizontally from each bar, 20 and 21, is a bracket-form bar, 30, whose legs are attached at their ends by rivets to said bars, 20 and 21, respectively, and adjacent the angle or bend thereof a pin-engaging eye, 29, may be mounted, and as other pins, 28, are supported directly from the straight bars, 20 and 21, it will be seen that the pins, 28, are located at various points which are substantially separated so that the meat may be advantageously engaged by the pins.

Although the weight of the metal and the parts of the holder when the latter is attached to the meat by the hook and pins tends to prevent any upward movement, I prefer to provide a spring latch, 31, which is pivoted to the curved bar, 16, to secure the frame in its lowered meat holding position, and the same latch, 31, may also serve to hold the frame in a raised position above the block when the meat holder is not to be used, and thus keep it out of the way when the block is used for other purposes, said latch engaging a tooth 32 on an arm 33 projecting from the standard 11.

The frame with all parts carried thereby may be held in a virtually elevated position wholly clear of the meat block by catching a hook 34 pivoted to the leg 17 over a pin 35 near the top of the standard 11.

A coiled spring 36 on the pivot 15 confined between a nut 37 on the latter and the top of the standard extension 38, exerts sufficient pressure to hold the latter when swung to different horizontal positions, the opposing faces of the extension 38 and foot member 14 being separably interlocked as by a projection 39 on the extension that engages sockets 40 in said member.

The chuck pins 28 may terminate at their upper ends in hooks 41, that may serve as means for the support of a saw when it is not being used.

What I claim is:

1. An attachment for butchers' blocks comprising a standard, a frame pivoted to the standard by a downwardly extending member and having a horizontally extending part below the pivotal connection with the standard, cooperating latch devices on the standard and frame which when engaged support the frame in a position raised above the block, a handle on the end of the frame opposite said standard, and meat-engaging means carried by said frame.

2. An attachment for butchers' blocks comprising a frame of horizontally extending spaced bars and a laterally extending bracket of spaced bars, chuck pins, means passing through the spaces between the bars adjustably attaching the chuck pins thereto, and means movably supporting the frame from the block.

3. An attachment for butchers' blocks comprising a frame of lower straight, and upwardly arched bars and a laterally extending bracket, vertical chuck pins adjustably connected with the frame certain of such pins being attached to said bracket, and a hook pivoted to the arched frame bar and hanging therefrom with its lower meat-engaging end extending horizontally.

In testimony whereof I hereunto affix my signature.

F. C. SHOWN.